United States Patent [19]

Katayama

[11] Patent Number: 5,074,276

[45] Date of Patent: Dec. 24, 1991

[54] SLICING METHOD BY A SLICING MACHINE

[75] Inventor: Ichiro Katayama, Mitaka, Japan

[73] Assignee: Tokyo Seimitsu Co., Ltd., Tokyo, Japan

[21] Appl. No.: 577,128

[22] Filed: Sep. 4, 1990

[30] Foreign Application Priority Data

Sep. 7, 1989 [JP] Japan .................................. 1-232426

[51] Int. Cl.⁵ ............................................. B28D 5/04
[52] U.S. Cl. .................................. 125/13.02; 51/5 C; 51/283 R
[58] Field of Search .............. 125/13.02; 51/5 C, 5 B, 51/5 R, 3, 283 R, 326, 327, 323, 73 R, 123 R

[56] References Cited

U.S. PATENT DOCUMENTS

| | | | |
|---|---|---|---|
| 4,756,796 | 7/1988 | Saitou | 51/5 C |
| 4,852,304 | 1/1989 | Honda et al. | 51/5 C |
| 4,881,518 | 11/1989 | Feldmeier | 51/5 C |
| 4,896,459 | 1/1990 | Brandt | 51/5 C |

Primary Examiner—M. Rachuba
Attorney, Agent, or Firm—Oliff & Berridge

[57] ABSTRACT

A slicing method by use of a slicing machine in which, after a cylindrical material is moved by a predetermined amount of indexing, the cylindrical material is moved to a rotating blade in the slicing direction of the blade and is sliced into a wafer having a predetermined thickness, and at the same time the end face of the cylindrical material is ground. In the slicing method according to the invention, the grinding position and the amount of indexing of the cylindrical material can be corrected in accordance with the actually measured data of the thicknesses of the wafer after slicing, the data of axial displacements of the blade detected during slicing, and the actually measured data of the shapes of the end face of the cylindrical material after slicing of the wafer. Thus, the grinding position can be calculated accurately, the loss of the cylindrical material can be minimized, and the slicing can be carried out with an accurate amount of indexing, so that the wafer can be manufactured with high accuracy.

5 Claims, 5 Drawing Sheets

SLICING METHOD BY A SLICING MACHINE

BACKGROUND OF THE INVENTION

1. Field of the Invention

The present invention relates to a slicing method by use of a slicing machine and, in particular, to such slicing method in which a slicing machine is used to slice a cylindrical material into thin pieces.

2. Description of the Related Art

Conventionally, in slicing out a cylindrical material such as a silicon ingot by use of a slicing machine to manufacture semiconductor wafers, after the ingot is lowered by the thickness of the wafer in an axially downward direction from a reference position, the ingot is moved toward a rotating blade (cutting edge) so that the ingot is sliced into the thin semiconductor wafers, each wafer having first and second wafer faces. Alternatively, in a slicing machine which performs the slicing of the wafers and the grinding of the wafer first face simultaneously, after the ingot is lowered downward by the amount of the desired thickness of the wafer plus the width for grinding, while the ingot is being moved toward the cutting edge, the slicing of the wafers and the grinding of the wafer first face are carried out simultaneously. In this case, the grinding width is found empirically from the thickness of the wafer and the like, that is, the grinding width can be determined by the skill or perspection of operators.

However, because the displacement of the blade (cutting edge) while slicing becomes unstable as the number of slicings are increased, the above-mentioned conventional slicing methods are disadvantageous in that they cannot manufacture desired wafers in a stable manner. Also, due to thermal stresses caused by the heats (such as the frictional heat of a bearing, heat generated by a motor and the like) that are generated by ambient temperatures, a coolant and the slicing machine, a relative positional relationship between the blade and the grinding wheel is changed, thereby making it impossible for wafers with high accuracy to be obtained. Further, since the blade and grinding wheel are worn as they repeat the slicing and grinding operations, the amount of grinding and the like are changed accordingly, which causes the wafers to vary in thicknesses. In addition, due to the fact that the amount of grinding of the wafer first face is set with considerable allowance, there is a possibility that the cylindrical material may be ground wastefully, which is not desirable from the viewpoint of costs.

SUMMARY OF THE INVENTION

The present invention aims at eliminating the drawbacks found in the above mentioned prior art slicing methods.

Accordingly, it is an object of the invention to provide a slicing method by a slicing machine which is capable of manufacturing wafers with high accuracy and of slicing a cylindrical material with no waste.

In order to achieve the above object, according to the invention, there is provided a slicing method by use of a slicing machine in which, after a cylindrical material is moved by a predetermined amount of indexing, the cylindrical material is moved in the cutting direction of a rotating blade (cutting edge), whereby the cylindrical material is sliced into wafers having a predetermined thickness and at the same time the first faces of the wafers are ground, characterized in that, in accordance with at least one of the data of the wafer thickness actually measured after sliced, the data of the axial displacement of the cutting edge detected during slicing, and the data of the end face shape of the cylindrical material actually measured after slicing of the wafers, a grinding position of a grinding wheel at which a sliced wafer has the predetermined thickness and an amount of indexing of the cylindrical material for providing the smallest amount of grinding are found and the cylindrical material is then moved downward according to the thus found indexing amount, and in that the grind wheel is moved to the above-mentioned grinding position so that the slicing of the cylindrical material and the grinding of the wafer first face can be performed simultaneously.

According to the invention, in slicing the cylindrical material, in accordance with at least one of the data of the wafer thickness actually measured after slicing, the data of the axial displacement of the cutting edge detected during slicing, and the data of the end face shape of the cylindrical material actually measured after slicing of the wafers, the grinding position of the grinding wheel for allowing the sliced wafer to have the predetermined thickness as well as the amount of indexing can be calculated. In other words, the accurate cutting width of the cutting edge is found from the data of the thickness of the wafer actually measured after slicing, and the amount of indexing and the amount of grinding are calculated in accordance with the thus found cutting width. Thus, by actually measuring the thicknesses of the wafer periodically, the wafers can be manufactured with a proper amount of indexing and at a proper grinding position, corresponding to the conditions of the cutting edge.

Also, according to the invention, due to the fact that the amount of indexing and the grinding position can be adjusted in each case in accordance with the axial displacement data of the cutting edge detected during slicing, even when the displacement of the cutting edge is varied during slicing, the grinding position and the amount of indexing can be corrected automatically and quickly without interrupting the slicing operation of the cutting edge.

Further, because the amount of indexing and the grinding position can be corrected by discovering clogging of the cutting edge and the changes of the shape of the cylindrical material end face caused by the dressing of the cutting edge from the actually measured data of the end face of the cylindrical material, it is possible to manufacture wafers with high accuracy even when the shape of the end face of the cylindrical material varies.

BRIEF DESCRIPTION OF THE DRAWINGS

The nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a slicing method by use of a slicing machine according to the present invention with reference to the accompanying drawings.

Figure 1:
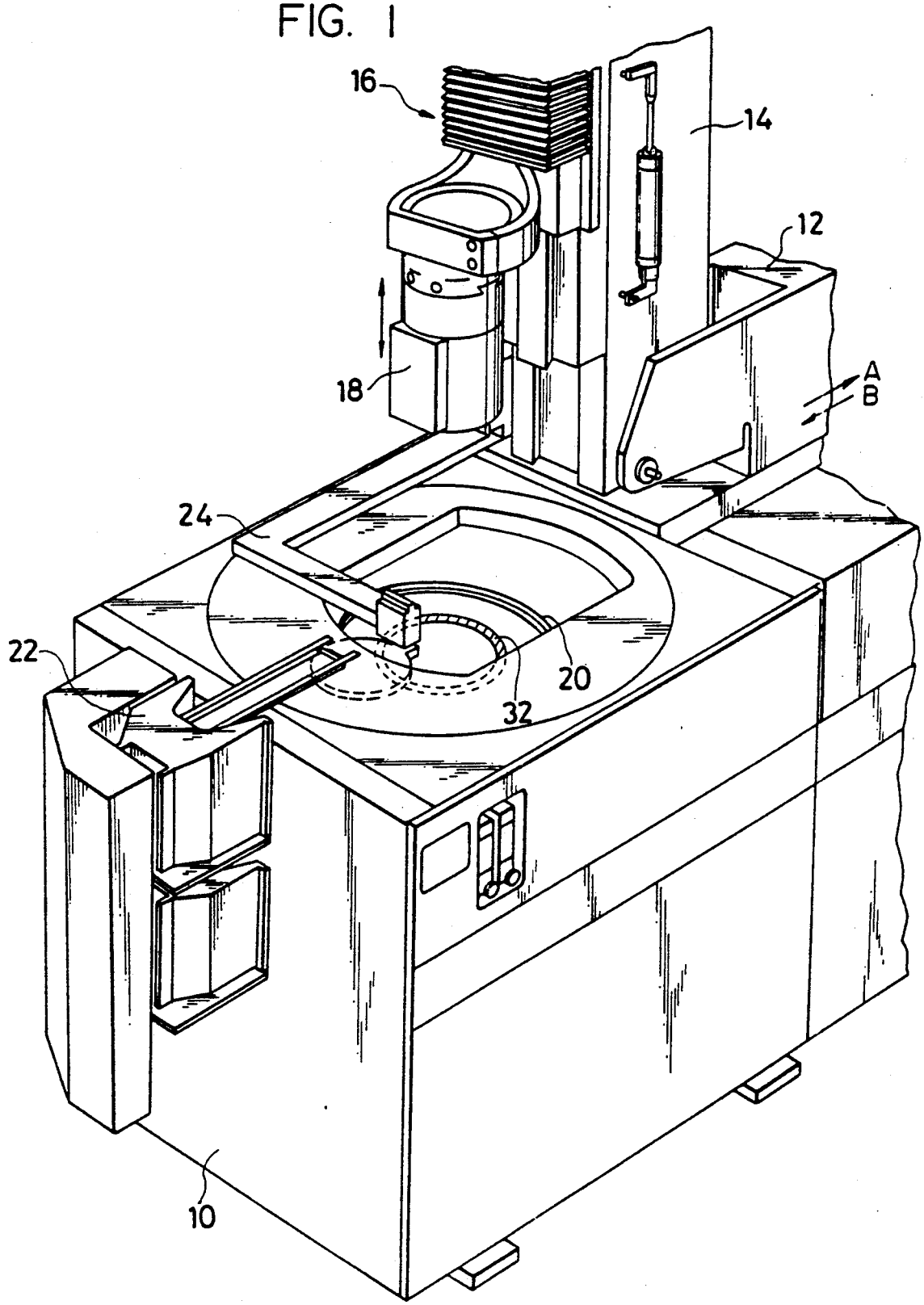
FIG. 1 is a perspective view of the general structure of a slicing machine used to enforce a slicing method according to the present invention.

In FIG. 1, there is shown a perspective view of the general structure of a slicing machine which is used to enforce a slicing method according to the present invention. The slicing machine shown in FIG. 1 comprises a main body 10, a slide feed table 12, a support member 14, an ingot (a cylindrical material) holding part 16 and the like. The slide table 12 is mounted on the main body 10 in such a manner that it can be freely slid in a direction of an arrow A or in a direction of an arrow B. The support member 14 is erected on the slide table 12 and supports an silicon ingot 18 such that the ingot 18 is freely movable in a vertical direction. In the central portion of the main body 10, there is disposed an inner peripheral blade (or, cutting edge) 20, and, at the opposed position of the main body 10 to the slide table 12, there is disposed a carrying device 24 which is used to carry a sliced wafer to a storage part 22. Also, a dressing device (not shown), which is used to dress the inner peripheral blade 20, is disposed below the inner peripheral blade 20. The dressing device dresses the inner peripheral blade 20 when the need arises.

Figure 2:
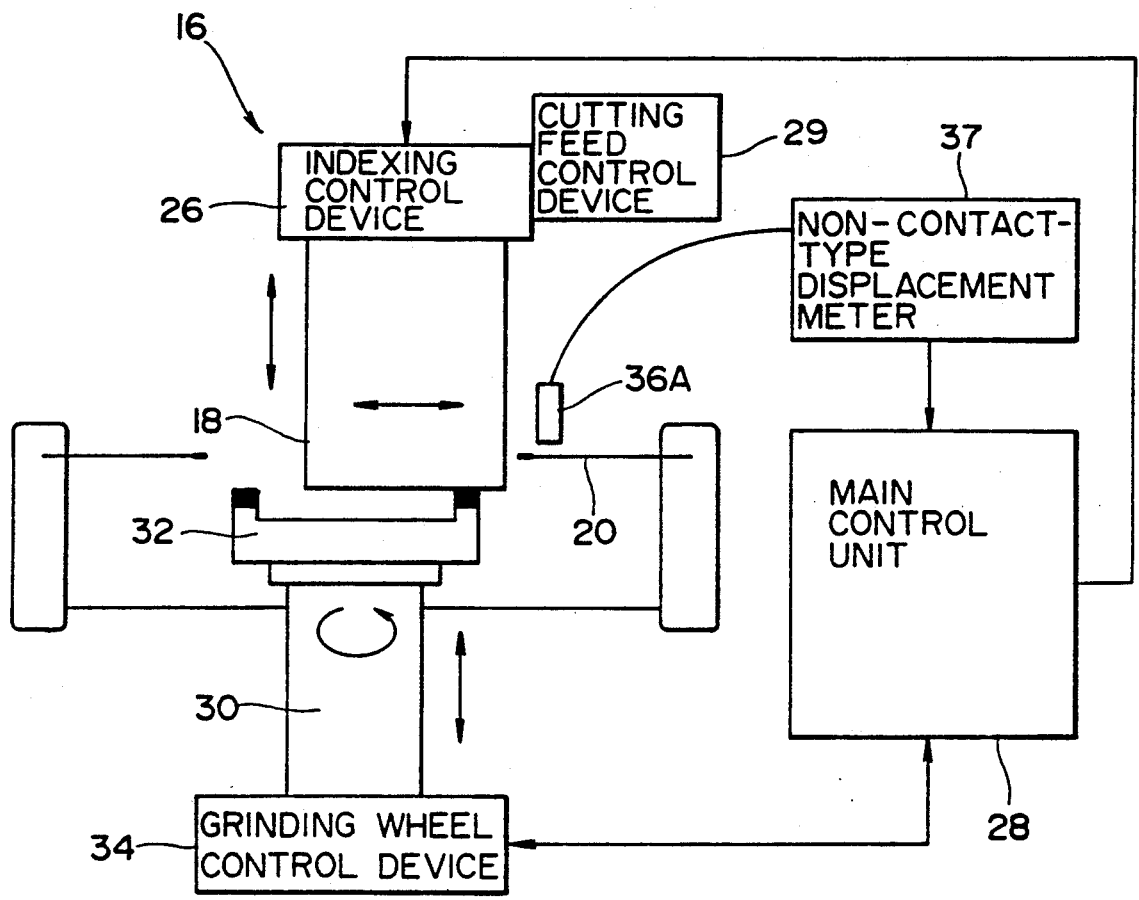
FIG. 2 is an explanatory view of a control system of the slicing machine shown in FIG. 1.

Referring now to FIG. 2, there is shown an explanatory view to illustrate a control system employed in the slicing machine in FIG. 1. As shown in FIG. 2, in the ingot holding part 16 there is provided an indexing control device 26 which is used to move the ingot 18 downward by an amount of indexing that is calculated by a main control unit 28 incorporated in the slicing machine. Also, in the slide table 12 (which is not shown in FIG. 2), there is provided a cutting feed control device 29 which is used to control the horizontal feeding position of the ingot 18 during slicing. The main control unit 28 calculates the amount of indexing of the ingot in the axial direction thereof during slicing according to the width to be cut (or, cutting width) by the inner peripheral blade 20 and the like, find a grinding position, finds a control position for cutting and feeding of the ingot 18 during slicing, and controls the slicing machine when it is slicing.

Also, in a spindle 30 which is used to rotate the inner peripheral blade 20, there is provided a cup-shaped grinding wheel 32 which rotates together with the inner peripheral blade 20. By means of the simultaneous rotation of the grinding wheel 32 and inner peripheral blade 20, the grinding of the first face of the sliced wafer and the slicing of the wafers can be executed simultaneously. Further, at the lower end portion of the spindle 30, there is provided a grinding wheel control device 34 which is connected to the main control unit 28. Responsive to an instruction given by the main control unit 28, the grinding wheel control device 34 moves the grinding wheel 32 upwardly or downwardly to thereby control the amount of grinding of the first face of the sliced wafer.

Figure 3:
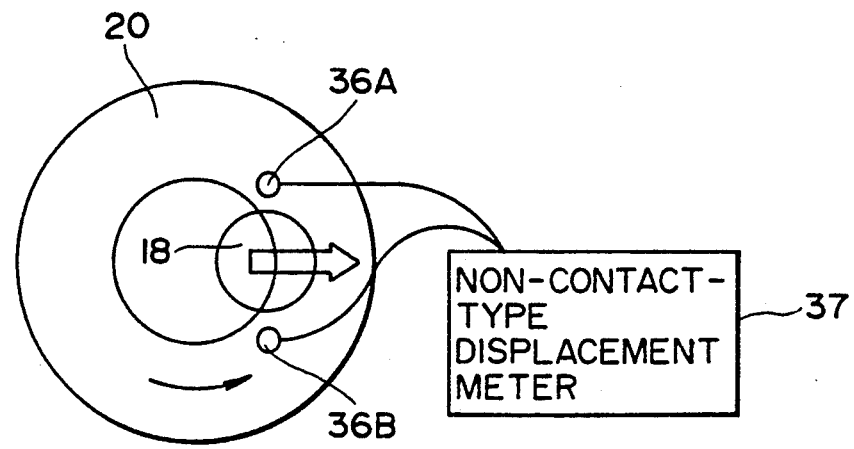
FIG. 3 is a general plan view to show a positional relationship between a displacement sensor and an inner peripheral blade.

Now, in FIG. 3, there is shown a general plan view which illustrates a positional relationship between displacement sensors 36A, 36B and the inner peripheral blade 20. As shown in FIGS. 2 and 3, in the neighborhood of the inner peripheral blade 20, there are mounted the displacement sensors 36A, 36B each of non-contact-type which are respectively used to detect the axial displacements of the inner peripheral blade 20. These sensors output the amounts of displacement of the inner peripheral blade 20 to the main control unit 28 by means of a non-contact-type displacement meter 37.

Next, description will be given below of a first embodiment of a slicing method by use of a slicing machine according to the invention. The first embodiment is a method which controls an amount of indexing of a cylindrical material from the data of sliced wafers actually measured. In this embodiment, at first, the ingot is cut or sliced without grinding of the end face of a sliced wafer and, next, the ingot is sliced with the wafer end face being ground. In particular, at first, if the cutting width KB of the inner peripheral blade 20 and the target thickness TT of the wafer are input to the main control unit 28, then the amount of indexing I of the ingot 18 in the vertical direction thereof can be determined according to the following equation:

$$I = (\text{Target Thickness } TT + \text{Cutting Width } KB) \times (1/\cos \theta_1) \times (1/\cos \theta_2) \quad (1)$$

where $\theta_1$, $\theta_2$ respectively represent the angles of tilting of the ingot 18 and these correspond to angles formed between the cutting direction of the ingot 18 and the standing direction of the ingot 18. When the cutting width KB of the inner peripheral blade 20 is not known, a provisional value (the thickness of the inner peripheral blade $+20 \sim 30$ $\mu$m) is to be input.

The main control unit 28 outputs to an indexing control device 26 a signal which allows the ingot 18 to be moved in an axial direction by the amount of indexing I found according the equation (1) and also outputs to a cutting feed control device 29 a drive signal which allows the ingot 18 to be moved in a horizontal direction, thereby slicing a piece of wafer for testing. Then, the thickness TM of the test wafer at the beginning of such slicing is measured and the actually measured thickness value TM is input to the main control unit 28, whereby the cutting width KB of the inner peripheral blade 20 is calculated according to the following equation (2). And, the thus calculated cutting width KB is substituted in the equation (1) to find a corrected amount of indexing I, and wafers are then sliced successively in accordance with the amount of indexing I.

$$\text{Cutting Width } KB = I \times \cos \theta_1 \times \cos \theta_2 - \text{Wafer Thickness } TM \text{ (Measured Value)} \quad (2)$$

During slicing, the wafer measuring operation is repeatedly performed periodically and the value of the cutting width KB is corrected by means of the equation (2), whereby the amount of indexing I can be calculated with accuracy with respect to the fluctuations of the cutting width KB caused by the worn inner peripheral blade 20 or the worsened cutting quality of the inner peripheral blade 20.

After the accurate calculation of the indexing amount I, the slicing of the wafer and the grinding of the end face of the ingot are executed simultaneously.

Figure 4:
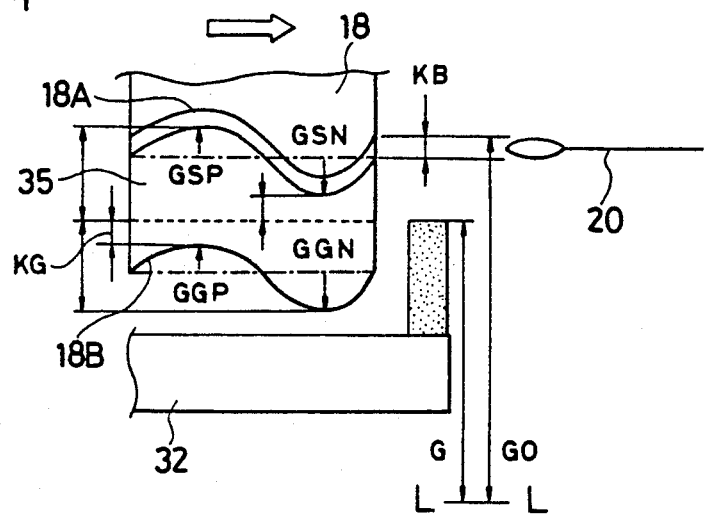
FIG. 4 is an explanatory view to show a relationship between a cylindrical material between an inner peripheral blade and a grinding wheel.

Referring now to FIG. 4, there is shown an explanatory view which illustrates relationships among the ingot 18, inner peripheral blade 20, grinding wheel 32 and wafer 35 sliced. At first, similarly in the above-mentioned case in which the grinding of the end face is not executed, the cutting width KB of the inner peripheral blade 20, the target thickness TT of the wafer, the minimum grinding width KG of the grinding wheel 32, and the grinding reference position GO are input to the main control unit 28. In this case, the cutting width KB is to be previously found with accuracy in the above-mentioned cutting operation in which no grinding is executed.

In FIG. 4, L—L line represents a zero position of screw feeding of the grind wheel 32 and GO represents a position which is distant by GO from the L—L line. When the grinding reference position GO is not known, the grinding reference position can be set in the following manner.

Figure 5:
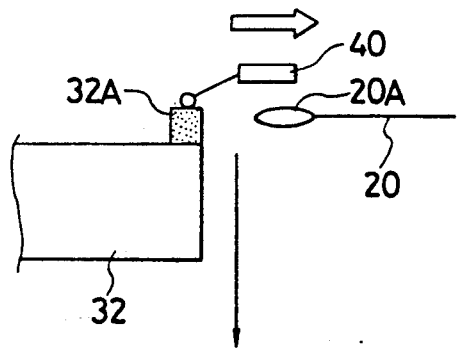
FIG. 5 is an explanatory view to show procedures required when a grinding reference position 60 is found.

In FIG. 5, there is shown an explanatory view to illustrate a procedure in finding the grinding reference position GO. At first, the spindle 30 of the slicing machine ceases to operate and an electric micrometer 40 is mounted onto the slide table 12. Then, while the slide table 12 is being moved and the upper surface of the grinding wheel 32 and the top-most portion of the inner peripheral blade 20 are being measured alternately, the grinding wheel 32 is moved upward and downward in such a manner that a difference between the heights thereof becomes 0. And, the position where the difference becomes 0 is set as the grinding reference position GO.

Referring back again to FIG. 4, GSP, GSN, GGP and GGN respectively represent parameters which stand for the concavity and convexity of a slice surface 18A and a grinding surface 18B. These parameters have the following relationships:

GSP, GGP≧0, GSN, GGN≦0

The main control unit 28 finds grinding positions $G_{min}$ and $G_{max}$ according to the following equations from the data input therein. Here, $G_{min}$ represents a position in which the thickness of the wafer becomes the smallest and $G_{max}$ represents a position in which the wafer thickness becomes the greatest. These grinding positions can be selected properly according to the processes to follow.

$$G_{min} = GO - TT - KB + GSN \quad (3)$$

$$G_{max} = GO - TT - KB + GSP \quad (4)$$

It is assumed here that the grinding displacement amounts GSN and GSP are 0, respectively. Therefore, at the grinding position G, $G_{min} = G_{max}$. By applying the value G to the following equation, the amount of indexing I of the ingot 18 can be found.

$$I = (GO - G + GGP + KG) \times (1/\cos \theta_1) \times (1/\cos \theta_2) \quad (5)$$

Further, the main control unit 28 moves the grinding wheel 32 up to the grinding position thereof from the grinding position G found according to the above-mentioned equation (3) and outputs to the indexing control device 26 a drive signal which is generated according to the amount of indexing I found from the above mentioned equation (5), thereby driving the ingot 18 to the indexing position. Next, the ingot 18 is moved in a slicing direction by means of the cutting feed control device 29 to thereby slice out a piece of wafer for testing. Then, the grinding and slicing are caused to stop temporarily and the whole testing wafer, including the cutting and normal-to cutting directions thereof, is measured to obtain the cut starting thickness, the greatest thickness and the smallest thickness thereof, respectively.

From the thus measured cut starting, greatest and smallest thicknesses, the grinding shift amounts GSP, GSN, GGP, and GGN can be found according to the following equations:

Grinding Shift Amount 1: GSP = Greatest Thickness
— Cut Starting Thickness TM

Grinding Shift Amount 2: GSN = Smallest Thickness
— Cut Starting Thickness TM

Grinding Shift Amount 3: GGP = Greatest Thickness
— Cut Starting Thickness TM

Grinding Shift Amount 4: GGN = Smallest Thickness
— Cut Starting Thickness TM

Also, the grinding reference position GO is automatically calculated according to the following equation and the thus calculated grinding reference position GO is substituted for GO that has been set in FIG. 5.

$$GO = G + TM + KB \quad (6)$$

If the grinding reference position set from the equation (6) is applied to the above mentioned equations (3) and (4), then the corrected grinding reference positions $G_{min}$ and $G_{max}$ as well as amount of indexing I are found, so that the wafer can be manufactured with the proper indexing amount and grinding position with respect to the cutting edge condition.

A second embodiment according to the present invention is a slicing method which controls a slicing machine according to the actually measured data of the wafer after slicing and the measured data of the axial shift amount of the inner peripheral blade 20. In the second embodiment, at first, in a similar procedure to the first embodiment in which the cutting or slicing is performed together with the grinding of the wafer first face, a piece of wafer for testing is sliced and then the whole testing wafer, including the cutting and normal-to-cutting directions, is measured to obtain the cut starting thickness TM, the greatest thickness and the smallest thickness thereof, respectively, so that the grinding reference position GO can be found according to the above-mentioned equation (6).

Figure 6:
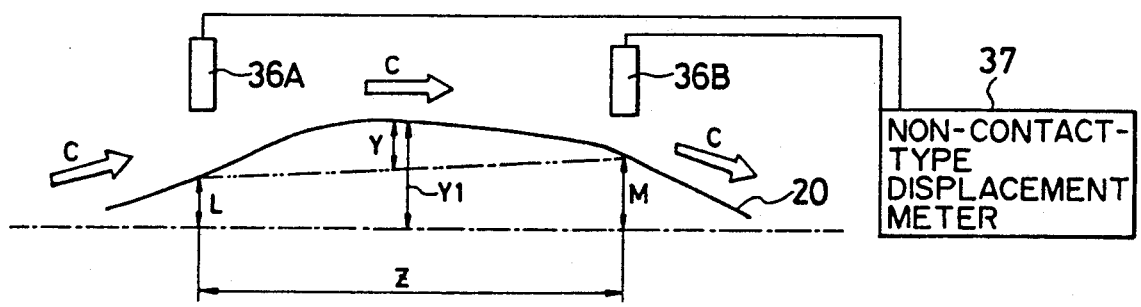
FIG. 6 is an explanatory view to show a relationship between an inner peripheral blade and a displacement sensor.
Figure 7A:
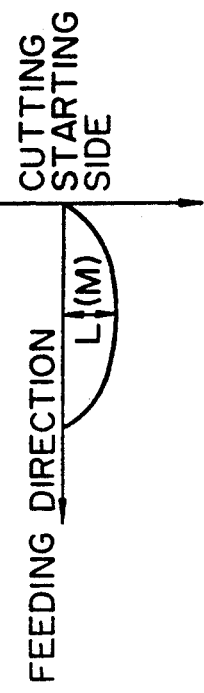
FIG. 7(A) to 7(F) are explanatory views, respectively showing the typical displacement patterns of an inner peripheral blade that are detected by a displacement sensor; and, FIG. 8 is a perspective view of a measuring instrument 38 used to measure the shape of the end face of an ingot.
Figure 7B:
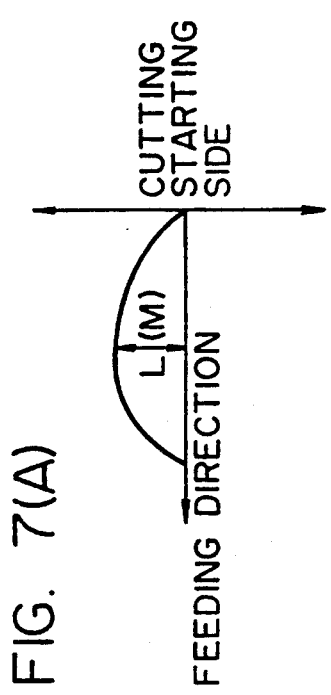
Figure 7C:
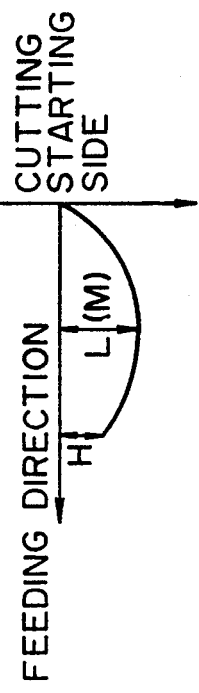
Figure 7D:
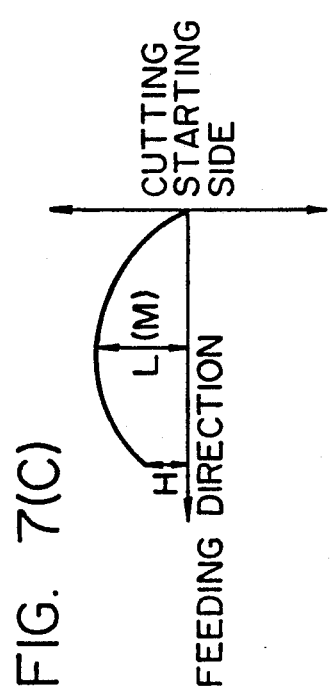
Figure 7E:
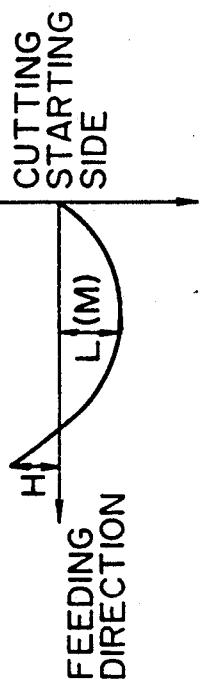
Figure 7F:
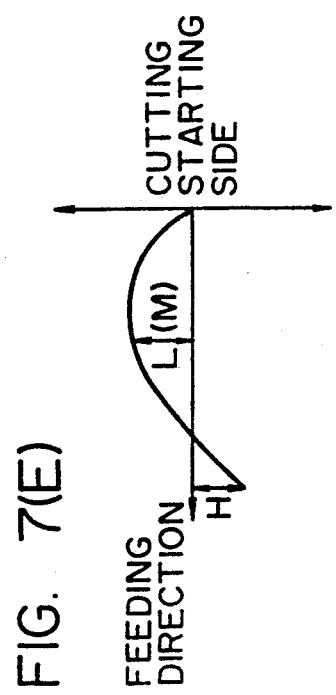

Next, description will be given below of a procedure of automatic correction of the grinding position G. In FIG. 6, there is shown an explanatory view which illustrates a mutual relationship between the inner peripheral blade 20 and the displacement, or shift, sensors 36A and 36B, and in FIGS. 7(A); (F), there are shown explanatory views which respectively illustrate the typical shift patterns of the inner peripheral blade 20 detected by the shift sensors 36A and 36B. The axial shift amounts of the inner peripheral blade 20 during slicing of the testing wafer are measured one after another by the shift sensors 36A and 36B and the thus measured data are stored in the main control unit 28. Most of the shift patterns detected can be classified in 6 types which are shown in FIGS. 7(A)~(F). The plus side greatest shift of the shift amounts of the inner peripheral blade 20 is designated by BPO and the minus side greatest shift thereof is designated by BNO. The axial shift amount is the average value of L and M when the two shift sensors 36A and 36B are used, while it is the value of L when only the shift sensor 36A is used. Also, for the axial shift amounts detected when other wafers than the testing wafer are sliced, the plus side greatest shift thereof is expressed by BP and minus side greatest shift is expressed by BN. In addition, if it is assumed, from the cut starting thickness TM, greatest thickness and smallest thickness of the testing wafer measured as mentioned above, that GP: Test Wafer Greatest Thickness—Cut Start Thickness TM and that GN: Test Wafer Smallest Thickness—Cut Start Thickness TM, then the correction calculation of the grinding shift amounts GSP, GSN, GGP and GGN is executed according to the following equations:

$$GSP = A \times (BP - BPO) + GP - IP \geq 0$$

$$GSN = A \times (BN - BNO) + GN - IN \leq 0$$

$$GGP = A \times (BP - BPO) + GP \geq 0$$

$$GGN = A \times (BN - BNO) + GN \leq 0$$

Further, the grinding position of the grinding wheel 30 and the amount of indexing of the ingot 18 are found according to the above-mentioned equations ③, ④ and ⑤. Here, A used in the above equation is a coefficient of grinding correction which represents the degree of influence of the fluctuations in the shift amounts of the inner peripheral blade 20 on the parameters GSP~GGN. This coefficient is obtained empirically by means of statistical treatments. Also, IP and IN in the same equations are used to represent dressing correction amounts which show the degrees of influence of the enforcement of dressing on the parameters GSP and GSN and these dressing correction amounts are obtained empirically.

In this manner, in the second embodiment, since, according to the shift data of the inner peripheral blade 20 input one after another, the indexing amount I and the grinding position G can be corrected each time during slicing, even when the shift amount of the inner peripheral blade 20 is caused to fluctuate during slicing due to the clogging or dressing, such correction can be repeated automatically, which makes it possible to manufacture highly accurate wafers.

Next, description will be given below of a third embodiment of a slicing method according to the invention. At first, in a similar procedure to the above-mentioned second embodiment, a piece of wafer for testing is sliced and the whole testing wafer, including the cutting and normal-to-cutting directions thereof, is measured to obtain the cut starting thickness TM, the greatest thickness and the smallest thickness of the wafer, and the grinding reference position GO is found according to the above-mentioned equation ⑥.

Figure 8:
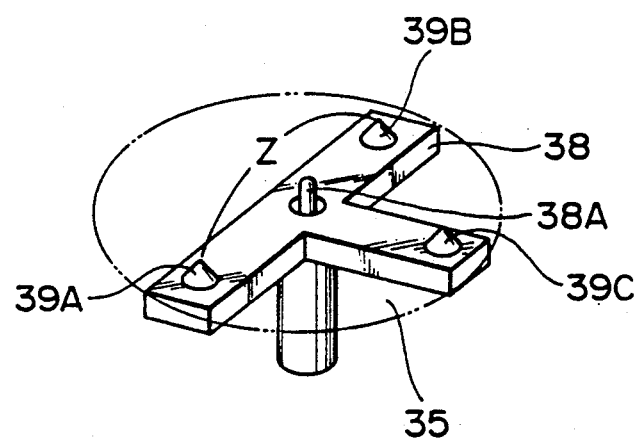

In FIG. 8, there is shown a perspective view of a measuring instrument 38 which is used to measure the shape of the end face of the ingot 18. The measuring instrument 38 includes three support members 39A, 39B and 39C, all of which are in contact with the end face of the ingot 18 after the testing wafer is sliced. The concavity and convexity of the ingot 18 are measured by a measuring member 38A which is disposed in the center of the measuring instrument 38 in such a manner that the cutting and normal-to cutting directions of the ingot 18 are separated from each other according to the direction of the measuring instrument 38. One of the measured values in the cutting direction and having the same polarity as GSP and GGP is expressed as XPO, and one of the measured values in the cutting direction and having the same polarity as GSN and GGN is expressed as XNO. Due to the fact that the measuring instrument 38 measures the ingot 18, one of XPO and XNO is 0.

Next, after a predetermined number of wafers are sliced, the shape of the ingot 18 is measured. One of the measured values in the cutting direction having the same polarity as GSP and GGP is expressed as XP and one of the measured values in the cutting direction having the same polarity as GSN and GGN is expressed as XN. These two values XP and XN as well as the cut starting thickness TM, the greatest thickness and the smallest thickness of the testing wafer measured in the above-mentioned operation are input to the main control unit 28.

GP: Test Wafer Greatest Thickness—Cut Starting Thickness TM

GN: Test Wafer Smallest Thickness—Cut Starting Thickness TM

Then, GP and GN are calculated according to the above-mentioned equations and further correction calculations on the grinding shift amounts GSP, GSN, GGP and GGN are performed by the main control unit 28.

$$GSP = A \times (XP - XPO) + GP - IP \geq 0$$

$$GSN = A \times (XN - XNO) + GN - IN \leq 0$$

$$GGP = A \times (XP - XPO) + GP \geq 0$$

$$GGN = A \times (XN - XNO) + GN \leq 0$$

Then, if the grinding shift amounts GSP, GSN, GGP and GGN found according to the above-mentioned equations as well as the grinding reference position GO found according to the equation ⑥ are substituted into the above-mentioned equations ③, ④ and ⑤ then the grinding position of the grinding wheel and the indexing amount of the ingot 18 can be found. A, IP and IN respectively represent a coefficient of correction and amounts of correction which are obtained empirically by means of statistical treatments, as in the before mentioned second embodiment. Also, until the end face of the ingot 18 is measured again, the grinding/slicing is executed at the same grinding position and in the same indexing amount. The intervals between the measurement of the end face of the ingot 18 are determined in consideration of production time and the needs for accuracy.

Accordingly, if the shapes of the end face of the ingot 18 are measured periodically in the continuous cutting processes and the grinding shift amounts are calculated for correction, then even if the shapes of the ingot end face are caused to change due to the clogging of the inner peripheral blade 20 and the dressing of the blade 20, the correction can be repeated and wafers with high accuracy can be produced.

Next, description will be given below of a fourth embodiment of a slicing method according to the invention. The fourth embodiment is a slicing method which controls a slicing machine in accordance with the actually measured data of wafers after sliced, the measured data of the axial shift amount of the inner peripheral blade 20, and the measured data of the shapes of the end face of the ingot 18 after sliced. In the fourth embodiment, at first, as in the before-mentioned first, second and third embodiments, the cutting width KB of the inner peripheral blade 20, the target thickness TT of the wafer, the minimum grinding width KG of the grinding wheel, and the grinding reference position GO are input to the main control unit 28 to drive the slicing machine so as to cut a piece of wafer for testing. During such cutting, the shifts that are detected by the shift sensors 36A, 36B are stored in the main control unit 28 as the shift patterns of the inner peripheral blade 20 in its wafer slicing, as in the second embodiment.

Further, similarly as in the third embodiment, the measuring instrument 38 shown in FIG. 8 is operated to measure the shape of the end face of the ingot 18 after it slicing the testing wafer. The ingot end face shape is measured from the cutting and normal-to-cutting directions thereof and the measured values are expressed as X, Y, respectively. Then these two values X, Y are input to the main control unit 28. Also, the shifts of the central portion of the inner peripheral blade 20 detected by the shift sensors 36A and 36B shown in FIG. 7 are respectively expressed by L and M, and the shift of the inner peripheral blade 20 in the end of slicing is expressed by H. If these values L, M and H are input to the main control unit 28, then the concave/convex X1 of the end face of the ingot 18 in the cutting direction after slicing and the concave/convex Y1 thereof in the normal-to-cutting direction (only Y1 is shown in FIG. 6) can be found according to the following equations, respectively:

$$X1 = X + \tfrac{1}{2} \times H$$

$$Y1 = Y + \tfrac{1}{2} \times (L+M)$$

However, when only the shift sensor 36A is used, then $Y1 = Y + L$.

And, the main control unit 28 selects the plus side greatest value and the minus side greatest value of X1, Y1, L, M and H as the plus side greatest shift BBPO of the inner peripheral blade 20 and the minus side greatest shift BBNO thereof, respectively. Further, the cut starting thickness TM, greatest thickness and smallest thickness of the testing wafer sliced are measured respectively and then these values are input to the main control unit 28.

GP: Test Wafer Greatest Thickness—Cut Start Thickness TM

GN: Test Wafer Smallest Thickness—Cut Start Thickness TM

According to the values GP, GN found from the above-mentioned equations, the correction calculations of the grinding shift amounts GSP, GSN, GGP and GGN are executed by the main control unit 28.

$$GSP = BBP - BBPO + GP - IP \geq 0$$

$$GSN = BBN - BBNQ + GN - IN \leq 0$$

$$GGP = BBP - BBPO + GP \geq 0$$

$$GGN = BBN - BBNO + GP \leq 0$$

If the corrected grinding shift amounts and the grinding reference position GO are substituted into the equation ③, ④ and ⑤, then the corrected grinding positions $G_{min}$ and $G_{max}$ and the amount of indexing I are calculated for each wafer, and wafers are ground and sliced successively. Since, during slicing, as in the second embodiment, the shift amounts of the inner peripheral blade 20 are always being input from the shift sensors 36A and 36B to the main control unit 28, the grinding positions and the indexing amount can be corrected automatically and quickly according to the fluctuations in such shift amounts. Also, if the shapes of the end face of the ingot 18 are measured periodically, then the variations in the shapes of the end face of the ingot caused by the clogged or dressed inner peripheral blade 20 can be detected, so that wafers with high accuracy can be manufactured. The intervals between the measurements of the end face shapes of the ingot 18 are determined in consideration of the production time and the needs for accuracy.

Further, in this embodiment, as in the other previously described embodiments, by repeating the actual measurements periodically, the conditions of the inner peripheral blade 20 and grinding wheel 32 can be corrected properly, which allows highly accurate slicing.

As has been described hereinbefore, according to the slicing method by use of a slicing machine according to the present invention, in accordance with the actually measured data of the wafer thickness after slicing, the axial shift data of the cutting edge detected during cutting, and the actually measured data of the end face shapes of the cylindrical material after the wafer is sliced, the grinding positions and the amount of indexing of the cylindrical material can be corrected. Thus, the accurate grinding positions can be calculated to thereby reduce the loss of the cylindrical material to a minimum and the slicing can be performed in an accurate amount of indexing, so that wafers of high accuracy can be manufactured easily and quickly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A slicing method by use of a slicing machine in which, after a cylindrical material is moved by a predetermined amount of indexing, the cylindrical material is moved to a rotating blade in the slicing direction of the blade and is sliced into a wafer having a predetermined thickness and, at the same time, a grinding wheel is moved to its grinding position to grind the first face of the wafer, said slicing method being characterized in that, in accordance with the actually measured data of the thickness of said wafer after slicing, the axial displacement data of said blade detected during slicing, and the actually measured data of the shapes of the end face of said cylindrical material after said wafer is sliced, a grinding position of the said grinding wheel in which the wafer after slicing has a predetermined thickness and an amount of indexing of said cylindrical material for minimization of an amount of indexing are calculated, said cylindrical material is moved downward in accordance with said amount of indexing, and said grinding wheel is moved to said grinding position, whereby a cylindrical slicing process and a wafer first face grinding process can be carried out simultaneously.

2. A slicing method by use of a slicing machine as set forth in claim 1, wherein the slicing start thickness, greatest thickness and smallest thickness of the sliced wafer are measured and, in accordance with the measured data of said wafer thicknesses, an amount of indexing of said cylindrical material and a grinding position of said grinding wheel are set.

3. A slicing method by use of a slicing machine as set forth in claim 1, wherein the slicing start thickness, greatest thickness and smallest thickness of the sliced wafer are measured, the axial displacement of said blade during slicing is measured, and an amount of indexing of said cylindrical material as well as a grinding position of said grinding wheel are set in accordance with the measured data of said wafer thicknesses and the measured data of said blade axial displacement.

4. A slicing method by use of a slicing machine as set forth in claim 1, wherein the slicing start, greatest and smallest thicknesses of the sliced wafer are measured, the shape of the end face of said cylindrical material after said wafer is sliced is measured, and an amount of indexing of said cylindrical material and a grinding position of said grinding wheel are set in accordance with the measured data of said wafer thicknesses and the measured data of said end face shape of said cylindrical material.

5. A slicing method by use of a slicing machine as set forth in claim 1, wherein the slicing start, greatest and smallest thicknesses of the sliced wafer are measured, the axial displacement of said blade during slicing is measured, the shape of the end face of said cylindrical material after said wafer is sliced is measured, and an amount of indexing of said cylindrical material as well as a grinding position of said grinding wheel are set in accordance with the measured data of said wafer thicknesses, the data of said measured displacement of said blade, and the measured data of said end face shape of said cylindrical material.

* * * * *